US012562941B2

(12) United States Patent
Radhakrishnan et al.

(10) Patent No.: US 12,562,941 B2
(45) Date of Patent: Feb. 24, 2026

(54) JOINT TIMING RECOVERY AND DECISION FEEDBACK EQUALIZER ADAPTATION IN WIRELINE NETWORK RECEIVERS

(71) Applicant: Texas Instruments Incorporated, Dallas, TX (US)

(72) Inventors: Saravanakkumar Radhakrishnan, Aruppukottai (IN); Raghu Ganesan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 354 days.

(21) Appl. No.: 17/954,463

(22) Filed: Sep. 28, 2022

(65) Prior Publication Data
US 2024/0106688 A1 Mar. 28, 2024

(51) Int. Cl.
*H04L 25/03* (2006.01)
*H04L 7/00* (2006.01)

(52) U.S. Cl.
CPC ...... *H04L 25/03267* (2013.01); *H04L 7/0062* (2013.01)

(58) Field of Classification Search
CPC ............. H04L 25/03267; H04L 7/0062; H04L 7/0025; H04L 25/03057
USPC ........................................................ 375/233
See application file for complete search history.

(56) References Cited

U.S. PATENT DOCUMENTS

| | | | | |
|---|---|---|---|---|
| 5,943,369 A | * | 8/1999 | Knutson | ............... H03L 7/0814 |
| | | | | 348/E5.009 |
| 6,650,718 B1 | * | 11/2003 | Fujimura | .............. H04L 7/0334 |
| | | | | 375/355 |
| 6,798,832 B1 | * | 9/2004 | Nakata | ............. G11B 20/10009 |
| | | | | 375/317 |
| 9,215,107 B1 | | 12/2015 | De Bernardinis | |
| 10,498,565 B1 | | 12/2019 | Azenkot et al. | |
| 11,424,968 B1 | * | 8/2022 | Sun | ..................... H04L 25/4908 |
| 2007/0110199 A1 | * | 5/2007 | Momtaz | ............ H04L 25/03057 |
| | | | | 375/350 |
| 2018/0131378 A1 | | 5/2018 | Haroun et al. | |
| 2021/0288836 A1 | * | 9/2021 | Ganesan | ........... H04L 12/40039 |
| 2022/0326290 A1 | * | 10/2022 | Asami | ................ G01R 29/0885 |

(Continued)

OTHER PUBLICATIONS

DP83TG720S-Q1 1000BASE-T1 Automotive Ethernet PHY, Datasheet SNLS604D (Texas Instruments Incorporated, Mar. 2021).

(Continued)

*Primary Examiner* — Don N Vo
(74) *Attorney, Agent, or Firm* — Xianghui Huang; Frank D. Cimino

(57) ABSTRACT
A network communications receiver and a method of operating the same in symbol timing recovery and equalization adaptation. A data converter samples a received analog signal at an initialization frequency higher than the symbol frequency of the received signal, and converts the samples to a digital sample stream. A decision feedback equalizer including a digital filter with one or more tap weights is adapted, and an error measurement obtained from the output of the decision feedback equalizer. In response to the error measurement crossing an error threshold value, a timing loop including timing error detection is initiated to adjust the phase of the sampling clock applied to the data converter.

23 Claims, 11 Drawing Sheets

(56)  References Cited

U.S. PATENT DOCUMENTS

2023/0254188 A1 *  8/2023  Cai  ........................ H04L 27/06
375/353

OTHER PUBLICATIONS

Gardner, "A BPSK/QPSK Timing-Error Detector for Sampled Receivers," vol. 34, No. 5, Trans. on Comm. (IEEE, 1986), pp. 423-429.
Ramezani et al., "An improved bang-bang phase detector for clock and data recovery applications," vol. 1, Int'l Symp on Circ. and Sys. (IEEE, 2001), pp. 715-718.
Mueller et al., "Timing Recovery in Digital Synchronous Data Receivers," vol. COM-24, No. 5 (IEEE, 1976), pp. 516-531.
International Search Report in corresponding PCT Patent Application No. PCT/US2023/033781, mailed Feb. 20, 2024.

* cited by examiner

SAMPLES (Fs = SYM RATE)                    x 10$^4$

JOINT TIMING RECOVERY AND DECISION FEEDBACK EQUALIZER ADAPTATION IN WIRELINE NETWORK RECEIVERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This relates to establishment of a network communications channel, and more specifically relates to timing recovery and adaptive equalizer adaptation in wireline network receivers.

In the field of network communications, a common reference model used to describe the architecture of a communications protocol is the Open Systems Interconnection (OSI) layered reference model. This reference model includes a stack of abstraction layers, the "lowest" of which is commonly referred as the physical layer, or "PHY." The OSI physical layer defines the electrical, timing, and other interfaces over which data bits are communicated over the communications link, whether wired (e.g., Ethernet) or wireless (e.g., cellular telephony, wireless local area network or WiFi). Communication elements such as electrical signals, signaling speeds, media and connector types, and network topologies are included within the PHY abstraction layer.

From a hardware standpoint, the term "PHY" refers to an electronic circuit, usually implemented as one or more integrated circuits, that implements the physical layer functions of the OSI model in a network interface controller or other network node. For example, a "PHY" is often used to refer to the transceiver circuitry in a network node that transmits and receives signals to and from another network node. Within the network node, a PHY connects a link layer device (often referred to as the "MAC" as an acronym for medium access control) to a physical medium such as an optical fiber or copper cable. A PHY device typically includes both physical coding sublayer (PCS) and physical medium dependent (PMD) layer functionality.

In the Ethernet context, a PHY can refer to a physical layer transceiver device for sending and receiving Ethernet frames according to the Ethernet physical layer portion of the IEEE Ethernet wireline packet transmission standards applicable to the particular network, for example the 1000BASE-T (1000 Mbps), 100BASE-TX (100 Mbps over copper), and 10BASE-T (10 Mbps) standards. In these implementations, the Ethernet PHY provides analog signal physical access to the link and, because the PHY generally does not handle MAC addressing, interfaces with a media-independent interface (MII) to a MAC chip in a microcontroller or another system executing higher layer functions.

In many network interface card (NIC) implementations, the Ethernet PHY is realized as an integrated circuit that implements the hardware send and receive functions of Ethernet frames and the interfacing between the Ethernet analog domain and the digital domain of the link-layer packet signaling. The NIC may integrate the PHY, MAC, and other functionality into a single integrated circuit, or alternatively as separate integrated circuits. Examples of modern Ethernet transceivers include the DP838xx, DP83TGxxx, and DP83TMxxx families of devices available from Texas Instruments incorporated.

One function of conventional Ethernet and some other wireline PHYs is referred to as clock and data recovery. Clock recovery involves the PHY receiver acquiring symbol timing of a received signal stream from the signal stream itself. To carry this out, conventional PHY receivers typically include a timing loop function, which detects timing error in the sampling of the received signal and adjusts the phase of a sampling clock to optimize the sampling point. Clock and data recovery also commonly includes adaptation of one or more equalizers at the PHY receiver, generally including an adaptive decision feedback equalizer (DFE), to optimize compensation for the effects of channel distortion in the received signal. As understood in the art, this channel distortion in the Ethernet context appears to a large extent as inter-symbol interference (ISI), which tends to spread out higher frequency pulses in time.

Timing error detection in Ethernet PHYs is commonly carried out according to a method described in Mueller et al., "Timing Recovery in Digital Synchronous Data Receivers," *Trans. on Comms.*, Vol. COM-24, No. 5 (IEEE, 1976), pp. 516-31, incorporated herein by this reference. In general, this approach adjusts the sampling phase to balance the pre-cursor ISI ($P_{-1}$) of a symbol with its post-cursor ISI ($P_1$). Adaptation of the DFE in the Ethernet PHY is performed to minimize the amplitude of both the pre- and post-cursor ISI.

It has been observed, in connection with the example embodiments described herein, that the timing error detection loop ("timing loop") adjustment and DFE adaptation are interconnected with one another, in that both involve monitoring and optimizing the post-cursor ISI ($P_1$). As a result, adjustment of the sampling phase by the timing loop will cause the DFE to adapt its coefficients, or tap weights, which in turn can cause the timing loop to again adjust the sampling phase, and so on. In some situations, this dependency of the timing loop and the DFE can result in long link-up times before convergence, if not a "dead-lock" condition in which the DFE converges to incorrect but stable coefficient values such that the timing loop fails to converge. These problems have been observed to be especially prevalent in short channels, in which ISI is relatively low and thus the timing error detection gain is low, and for certain types of modulation that have relatively fewer symbol transitions (e.g., MLT-3) and thus exhibit low ISI.

It is within this context that the embodiments described herein arise.

BRIEF SUMMARY OF THE INVENTION

According to one aspect, a method of symbol timing recovery and equalization of signals having a symbol frequency and received by a physical layer transceiver includes sampling with a sampling clock initially at a frequency greater than the symbol frequency, converting the sampled signal to a digital sample stream and equalizing the digital sample stream with a decision feedback equalizer to produce an output digital stream. The method further includes adapting at least one tap weight of the decision feedback equalizer, and calculating an error measurement from the output sample stream. In response to the error measurement crossing an error threshold value, a phase of the sampling clock is then adjusted.

According to another aspect, a network communications receiver has an input receiving an analog signal having a symbol frequency, and a data converter configured to sample the analog signal responsive to a sampling clock signal and convert the sampled signal to a digital sample stream. Clock generation circuitry is configured to generate the sampling clock signal at a phase responsive to a clock control signal generated by clock control circuitry in digital receiver circuitry of the receiver. The digital receiver circuitry has an input coupled to receive the digital sample stream from the data converter, and further includes a decision feedback equalizer comprising a digital filter with one or more tap weights that produces an output digital stream from the digital sample stream. The digital receiver circuitry also includes error measurement circuitry measures error in samples of the output sample stream, clock control circuitry, configured to generate the clock control signal to the clock generation circuitry. Sequencer logic controls the operation of the circuitry to control the clock generation circuitry to generate the sampling clock signal at an initialization frequency above the symbol frequency, adapt at least one tap weight of the decision feedback equalizer, and calculate an error measurement from the output sample stream. In response to the error measurement crossing an error threshold value, the clock control signal then adjusts a phase of the sampling clock.

Technical advantages enabled by one or more of these aspects include rapid and accurate joint convergence of equalization and sample timing in a network receiver, even in implementations in which the equalization and timing loop are interdependent Other technical advantages enabled by the disclosed aspects will be apparent to those of ordinary skill in the art having reference to the following specification together with its drawings.

BRIEF DESCRIPTION OF THE SEVERAL VIEWS OF THE DRAWING

The same reference numbers or other reference designators are used in the drawings to illustrate the same or similar (in function and/or structure) features.

DETAILED DESCRIPTION OF THE INVENTION

One or more example embodiments are described in this specification as implemented into a physical layer transceiver device in a high-speed Ethernet-type network, as it is contemplated that such implementation is particularly advantageous in such applications. However, it is also contemplated that aspects of these embodiments may be beneficially applied in other applications, for example in connection with other wireline network technologies. Accordingly, it is to be understood that the following description is provided by way of example only, and is not intended to limit the true scope of this invention as claimed.

Figure 1:
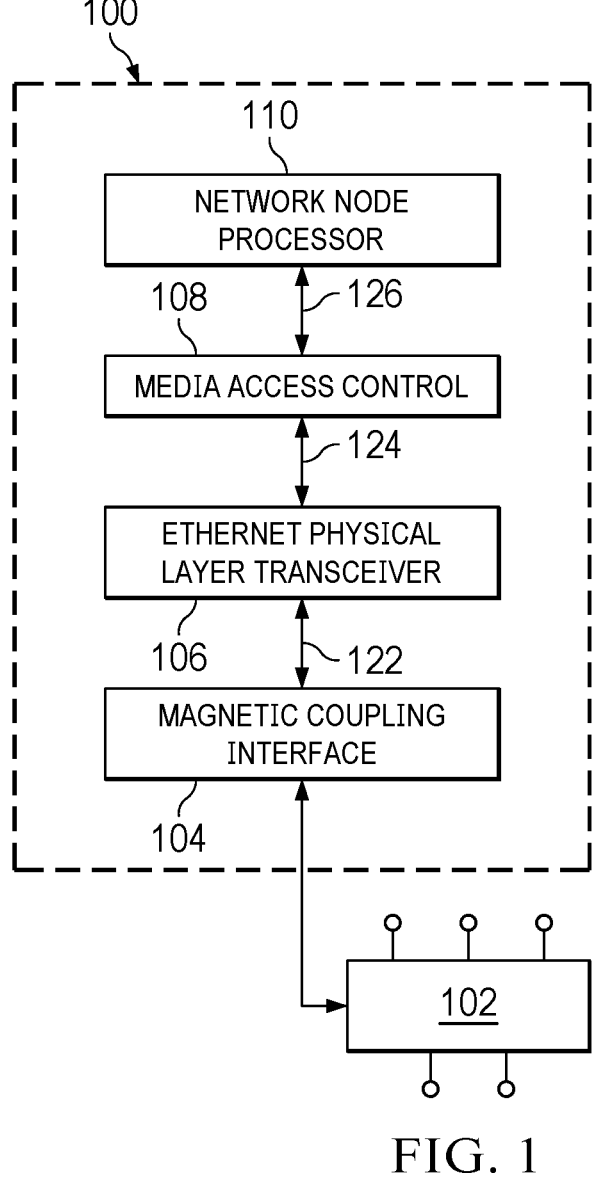
FIG. 1 is an electrical diagram, in block form, of a network node constructed according to example embodiments.

FIG. 1 illustrates an example of network node 100 into which embodiments may be implemented. Network node 100 may be realized as any one of a number of network functions, such as a computing device in the role of either or both a network server or client, a peripheral device such as an input/output function, a sensor or controller, a router, a switch, or another network function. Network node 100 is coupled to network communications medium 102 by way of which it receives and transmits data and control information. In this particular example in which the network communications are carried out over an Ethernet network, network communications medium 102 is implemented as CAT6 copper wiring or the like. In other implementations, network communications medium 102 may be realized as optical fiber or the like.

In the example of FIG. 1, network node 100 includes Ethernet physical layer transceiver (PHY) 106 constructed according to an embodiment. For this example in which network communications medium 102 is a copper wireline Ethernet connection, PHY 106 is coupled to medium 102 by magnetic coupling interface 104. Magnetic coupling interface 104 is provided to galvanically isolate medium 102 from PHY 106 while providing a signal path. For example, magnetic coupling interface 104 may be realized as a discrete Ethernet magnetics module disposed in the signal path between PHY 106 with a connector jack to physically couple to network communications medium 102. Alternatively, magnetic coupling interface 104 may be integrated into the same housing or package as an Ethernet connector jack. In either case, interface 122 between PHY 106 and magnetic coupling interface 104 in this implementation is referred to in the Ethernet context as a Media Dependent Interface (MDI), in that its specifications depend on the particular medium used for network communications medium 102.

Ethernet PHY 106, in this example embodiment, includes the appropriate circuitry for sending and receiving data and control information between upstream functions and network communications medium 102. In the Ethernet context, PHY 106 receives digital data in the form of Ethernet frames from Media Access Controller (MAC) 108 and generates analog signals corresponding to those frames for transmission over medium 102. In its receive function, PHY 106 processes analog signals received over medium 102, and for those signals representative of data intended for network node 100, digitizes and formats digital data into Ethernet frames for consumption and processing by MAC 108 and functions further upstream. As such, PHY 106 serves as the interface between the Ethernet analog domain at medium 102 and the digital domain of link-layer packet signaling for network node 100 as performed by MAC 108. The construction and operation of PHY 106 according to example embodiments will be described in further detail below.

According to this example embodiment, PHY 106 is coupled to MAC 108 by interface 124, which in this implementation is referred to in the Ethernet context as a Media Independent Interface (MII) or Reduced Gigabit Media Independent Interface (RGMII), in that the interface specifications are independent of the physical implementation of network communications medium 102. Media Access Controller (MAC) 108 in network node 100 includes the appropriate circuitry for processing data received from the network via PHY 106, and to be communicated to PHY 106 for transmission. This processing may include, for example, managing frame buffering of the data in both the transmit and receive directions, packet formatting and recognition, timer functions, and other conventional operations involved in the data-link-layer, or MAC layer, portion of the OSI model. MAC 108 is typically integrated into a processor, field programmable gate array (FPGA), digital circuitry, memory, application-specific integrated circuit (ASIC), software, or a combination thereof. MAC 108 may be realized in the same integrated circuit as PHY 106 and MII interface 124, or alternatively as one or more integrated circuits separate from PHY 106.

In the example of FIG. 1, network node processor 110 is coupled to MAC 108 by way of an interface 126. Network node processor 110 provides the data processing and control capability appropriate to carry out the function of network node 100 in the network. Network node processor 110 may be realized as a microprocessor, microcontroller, FPGA or another switch fabric, and/or other appropriate circuitry for that function. Network node processor 110 may be realized in the same integrated circuit as MAC 108, or alternatively as one or more separate integrated circuits. In one example of the latter case, MAC 108, PHY 106, and magnetic coupling interface 104 may be realized in a network interface card (NIC) to which network node processor 110 is coupled via interface 126.

Figure 2:
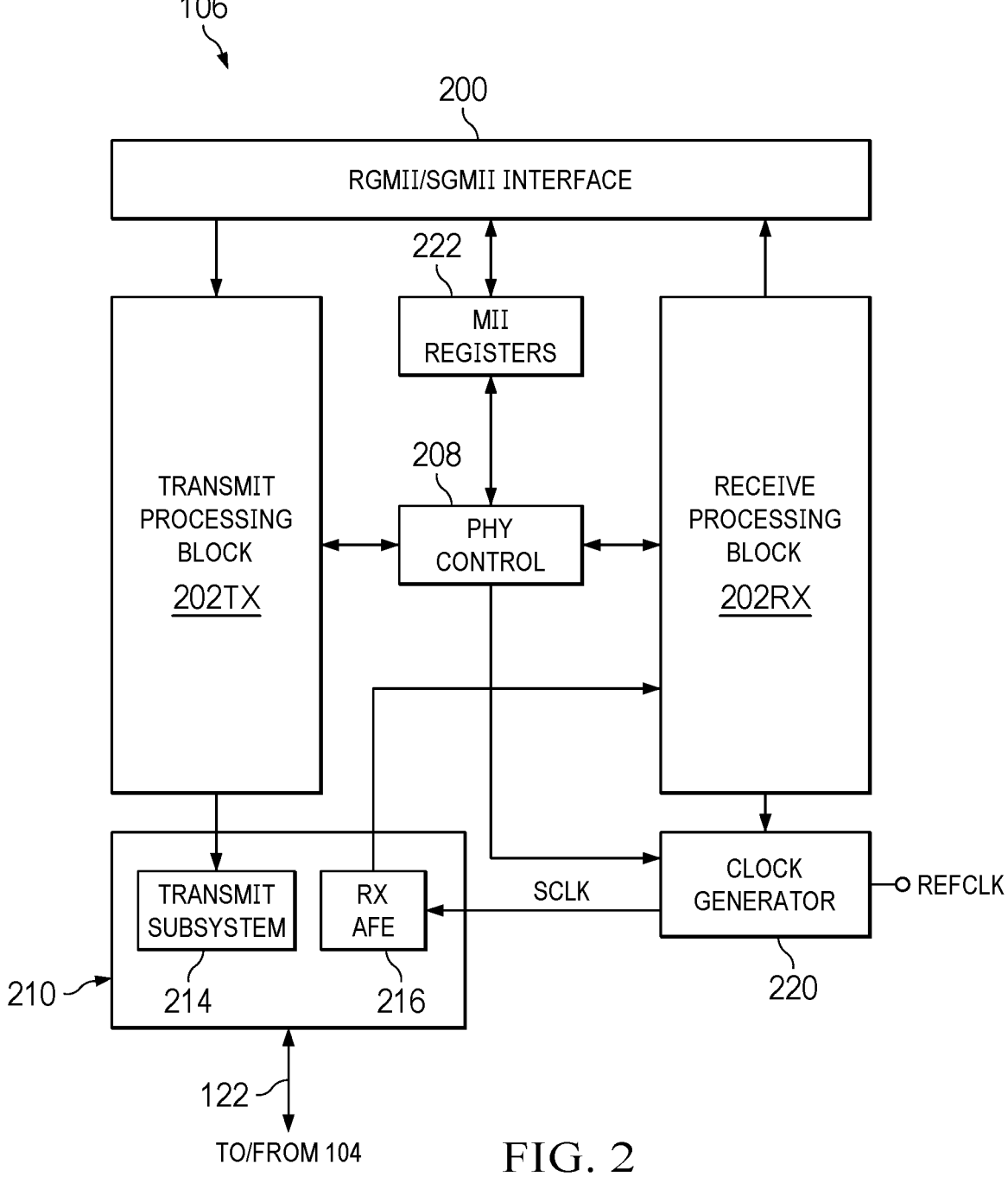
FIG. 2 is an electrical diagram, in block form, of a physical layer transceiver (PHY) constructed according to an example embodiment.

FIG. 2 illustrates an architecture of PHY 106 according to an example embodiment. As mentioned above, PHY 106 has an overall function of interfacing communications between the Ethernet analog domain at network communications medium 102 and the digital domain of link-layer packet signaling for network node 100 as performed by MAC 108. As such, PHY 106 in this example includes MII interface circuitry 200 by way of which digital signals processed or to be processed by PHY 106 are communicated to and received from MAC 108, respectively, over interface 124, according to the appropriate RGMII or MII protocol, as the case may be.

For the processing of the digital data to be communicated to and as received from MAC 108, PHY 106 includes one or more communications processing blocks. In this example, PHY 106 includes transmit processing block 202TX, for processing data received from upstream functions in network node 100 for transmission from PHY 106 to the network, and receive processing block 202RX, for processing data received from the network to be forwarded to upstream functions in network node 100. In this example in which PHY 106 is operable to process communications according to any of three Ethernet industrial protocols, processing blocks 202TX, 202RX (collectively or individually referred to as "processing block 202") may each include a 100BASE-TX processing block, a 10BASE-Te processing block, and a 1000BASE-T processing block. Alternatively, for the case in which network node 100 is implemented in the context of an automotive network, processing blocks 202 of PHY 106 would be configured to process communications according to the applicable automotive Ethernet protocols. Processing blocks 202TX, 202RX are each coupled on one side to MII interface circuitry 200 and is coupled on another side to hybrid block 210 for communication with network communications medium 102 via magnetic coupling interface 104. Processing blocks 202TX, 202RX each include digital logic circuitry (or other circuitry, memory and/or software) configured and operable to process digital data as appropriate for the particular protocols involved. For example, the digital logic circuitry included in processing blocks 202TX, 202RX may be implemented at least in part in a digital signal processor, either as a standalone processor or embedded in a larger scale integrated circuit, and/or sequential logic in the form of one or more state machines. PHY control block 208 includes the appropriate logic and configuration registers configured to control processing blocks 202TX, 202RX and other functions of PHY 106 to operate in a selected one of multiple operating modes.

In the Ethernet context of this example, digital logic circuitry in processing blocks 202TX, 202RX is arranged to implement one or more sublayers in the applicable Ethernet protocol, such as one or more of the Physical Coding Sublayer (PCS), Physical Medium Attachment (PMA) sublayer, and the Physical Medium Dependent (PMD) sublayer (in order from the MII side to the Ethernet medium side), depending on the operating mode (e.g., 100BASE-TX, 10BASE-Te, and 1000BASE-T).

In this implementation, hybrid block 210 is configured and operable to convert signals between the digital domain of processing blocks 202TX, 202RX and the analog domain (e.g., as communicated over network communications medium 102). As such, converter block 210 includes digital-to-analog (DAC) conversion and analog-to-digital (ADC) conversion functionality, as well as driver and receiver circuitry coupled to magnetics coupling interface 104. The circuits and functions of hybrid block 210 involved in the transmission of digital data to network communications medium 102 including, for example, a DAC for converting digital data from transmit processing block 202TX to the analog domain along with the appropriate filters and amplifiers, is shown in FIG. 2 by transmit subsystem block 214. For the receipt of signals from network communications medium 102, hybrid block 210 includes receiver analog front end (AFE) 216. AFE 216 includes the appropriate circuitry involved in receiving analog signals from medium 102 and converting those received signals into digital data and control symbols for communication to receive processing block 202RX under the operative protocol. In that regard, and as will be described in further detail below, AFE 216 may include analog filters, level shifters, one or more programmable gain amplifiers, ADC functionality, and other circuitry for carrying out these operations.

PHY 106 also includes clock generator circuitry 220, which in this example is constructed and operable to provide the appropriate clock signals to hybrid block 210, and for purposes of the example embodiments described herein, specifically to provide the appropriate clock signal(s) to receiver AFE 216. Clock generator circuitry 220 may generate these clocks based on a received master clock signal (e.g., from a crystal oscillator or bulk acoustic wave device external to PHY 106 and coupled at terminal REFCLK), or based on a master clock signal generated externally to or within PHY 106. Clock generator circuitry 220 also may receive control signals from receive processing block 202RX and/or PHY control block 208 as indicated in FIG. 2.

Certain additional functions are also provided in PHY 106 according to this example embodiment. As noted above, shown in FIG. 2, PHY 106 includes PHY control block 208, which includes management and control circuitry constructed and operable to execute the appropriate operations for control of PHY 106 as an integrated circuit device, such operations including reset, interrupt generation and handling, circuitry for receiving and communicating status and control information from and to external circuitry, and the like. For example, MII registers 222 may be provided to store configuration and status information relevant to MII interface 200 and communication with upstream functions. Other functions not shown in FIG. 2 may also be provided in PHY 106, such functions including power management, a "wake on LAN" circuit function, an auto-negotiation circuit function, and the like.

Figure 3A:
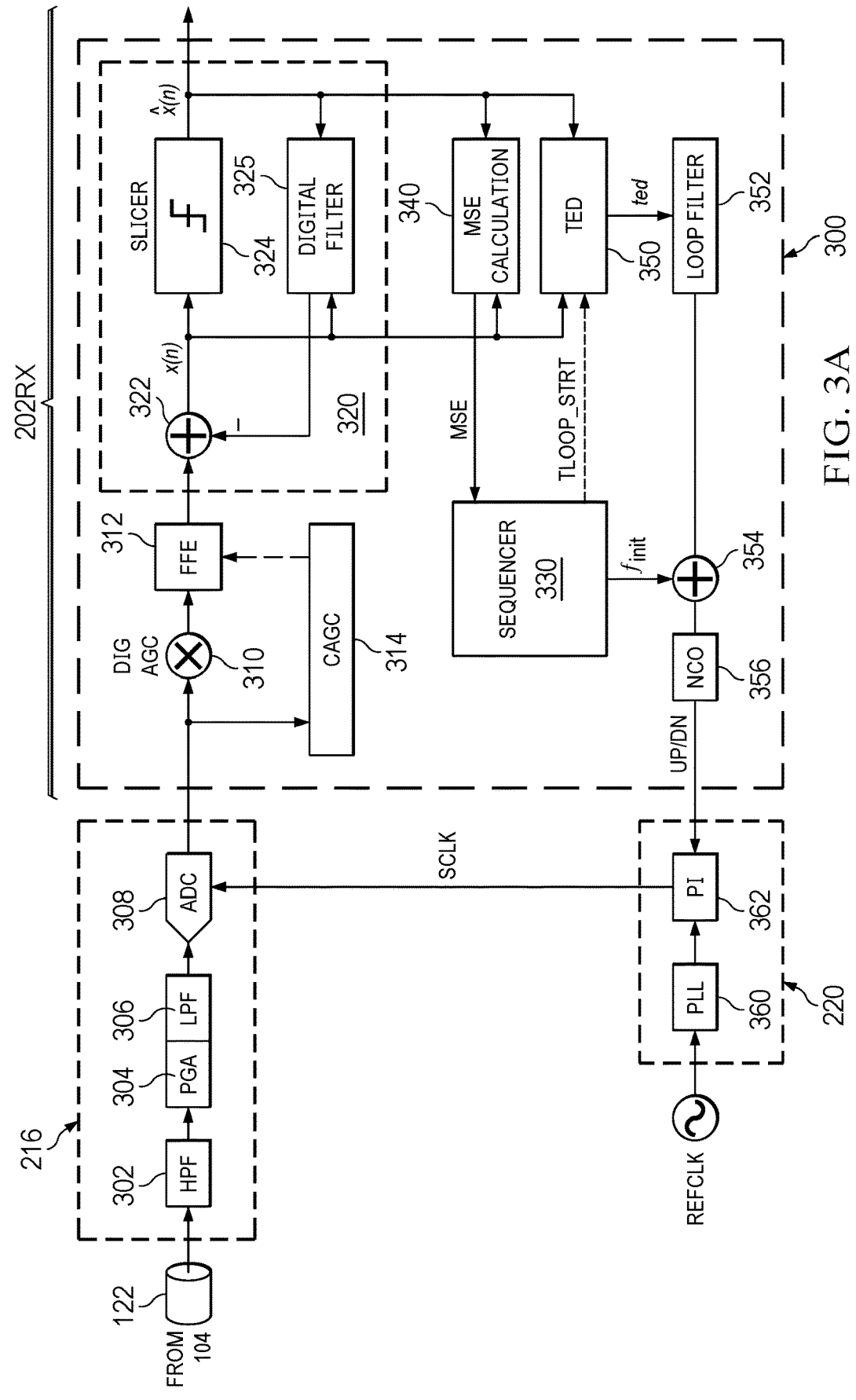
FIG. 3A is an electrical diagram, in block form, of circuitry in the receive path of the PHY of FIG. 2 according to an example embodiment.

FIG. 3A illustrates an example of certain circuitry in the receive path of PHY 106 according to example embodiments, such circuitry including AFE 216, clock generator circuitry 220, and a portion of receive processing block 202RX. AFE 216 includes analog high-pass filter 302 having an input coupled to interface 122, to receive incoming signals from network communication facility 102 via magnetic coupling interface 104. The output of high-pass filter 302 is coupled to programmable gain amplifier 304 and analog low-pass filter 306, the output of which is coupled to an input of ADC 308. In this example, high-pass filter 302 and low-pass filter 306 provide signal conditioning on the signal received from interface 122, and programmable gain amplifier (PGA) 304 applies automatic gain control (AGC) to the input signal as conditioned.

ADC 308 samples the conditioned and amplified analog signal at a phase and frequency of sampling clock SCLK from clock generator circuitry 220, and converts each sample of that signal into a digital symbol. In this implementation in Ethernet PHY 106, the sampling rate of ADC 308 is one sample per symbol (1Sps), and as such the frequency of sampling clock SCLK is at the symbol rate of the received analog signal. This symbol frequency may be set by the applicable standard (e.g., IEEE standard 802.3ab for "Gigabit Ethernet"), may be negotiated between network node 100 and the network on connection, or may be otherwise communicated to PHY 106 and applied to clock generation circuitry 220. The phase of sampling clock SCLK within each symbol period is controlled and adjusted by clock generation circuitry 220, for example in response to observed signal quality as will be described below. The symbol stream produced by ADC 308 in AFE 216 is forwarded to receive processing block 202RX.

FIG. 3A shows the architecture of symbol timing recovery and equalization circuitry 300, which constitutes a portion of the circuitry of receive processing block 202RX. In particular, symbol timing recovery and equalization circuitry 300 as shown in FIG. 3A operates to perform the operations of symbol timing recovery from the symbol stream produced by AFE 216 along with adaptation for equalization, as part of clock and data recovery operations performed on the symbol stream from AFE 216. Symbol timing recovery and equalization circuitry of FIG. 3A may be implemented as a digital signal processor (DSP), integrated as an embedded processor into a single integrated circuit along with other circuitry of PHY 106 or as a stand-alone processor, or alternatively may be implemented as custom, semi-custom, application-specific, or other logic circuitry, programmable or hard-wired, and the like.

As shown in FIG. 3A, the symbol stream received from AFE 216 is applied to digital automatic gain control (AGC) function 310, which dynamically adjusts a gain applied to the received symbol stream in the common manner. Feedforward equalizer (FFE) 312 receives the output of AGC function 310 in this example, and operates as a pre-set (e.g., non-adaptive) equalizing filter. The coefficients or tap weights of FFE 312 are set by channel AGC function 314, which obtains a coarse channel estimate from the symbol stream as received from AFE 216.

After amplification by AGC 310 and equalization by FFE 312, the received symbol stream is applied to decision feedback equalizer (DFE) 320 according to this example embodiment. In this implementation, DFE 320 is an adaptive equalizer, with its coefficients or tap weights (such terms used interchangeably in this description) dynamically adapted to reduce the residual post-cursor ISI from the symbol stream.

As shown in FIG. 3A, DFE 320 can be considered as adder function 322 having one input receiving the symbol stream from the output of FFE 312, and a second input receiving a feedback signal, which adder 322 subtracts from the symbol stream and outputs the remainder to decision slicer 324 as residue samples x(n). Slicer 324 quantizes the residue samples from adder 322 to produce output symbols x̂(n) for processing by other circuitry in receive processing block 302RX before forwarding to upstream functions in network node 100. Digital filter 325 applies a digital filter function to output symbols x̂(n) from slicer 324 to generate the feedback to be subtracted by adder 322 from the incoming symbol stream. In a general sense for this example implementation, digital filter 325 is adapted so that the feedback signal applied to adder 322 removes one or more residual post-cursors to compensate for ISI resulting from channel distortion.

Figure 3B:
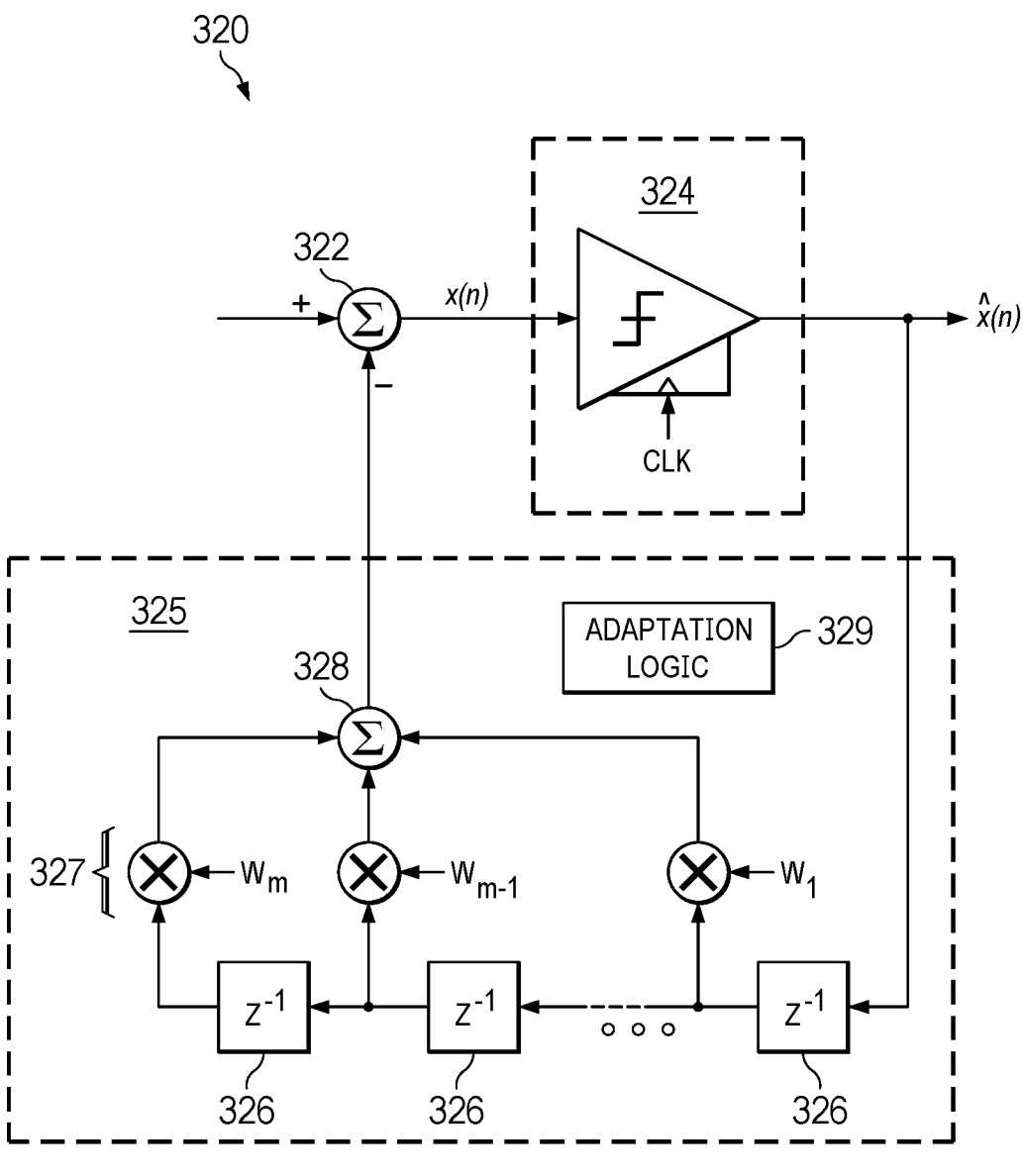
FIG. 3B is an electrical diagram, in block form, of a decision feedback equalizer according to the example embodiment of FIG. 3A.

FIG. 3B illustrates a configuration of DFE 320 in which digital filter 325 is illustrated in more detail. In this example, digital filter 325 includes one or more delay stages 326 connected in series, with the output of each delay stage 326 multiplied by a tap weight $w_k$ at a corresponding one of multipliers 327, and the resulting products summed at adder 328 to generate the feedback signal applied as the subtrahend to adder 322. Adaptation logic 329 is provided in DFE 320 (or elsewhere in DSP 300) to adapt the tap weights $w_k$ applied by multipliers 327 according to an adaptation equation. For example, adaptation logic 329 may adapt each of the m tap weights $w_k$ in the example of FIG. 3B according to a recursive least-mean-squares equation:

$$w_k(n){=}w_k(n{-}1){+}\mu{\cdot}err{\cdot}\hat{x}(n{-}1) \tag{1}$$

where n and n−1 are the indices for the $n^{th}$ and $(n{-}1)^{th}$ sample, respectively, in the digital symbol stream being processed by DFE 320, μ is a learning constant between 0 and 1, x̂(n−1) refers to the output of slicer 324 for the $(n{-}1)^{th}$ sample, and err represents the difference between the sample x(n) at the input of slicer 324 and the slicer output x̂(n) for that $n^{th}$ sample:

$$err{=}x(n){-}\hat{x}(n) \tag{2}$$

The number m of tap weights in, and thus the order of, digital filter 325 may vary according to the particular implementation. Adaptation logic 329 may operate to adapt tap weights $w_k$ after each sample.

DFE 320 may alternatively be implemented according to any conventional approach for decision feedback equalizers.

Symbol timing recovery and equalization circuitry 300 according to the example architecture of FIG. 3A also includes MSE calculation circuitry 340 with an input receiving symbol stream x̂(n) from the output of slicer 324 and an input receiving residue samples x(n) from adder 322 at the input of slicer 324, and based on those samples calculates an error measurement. This error measurement is a measure of noise, including ISI, at slicer 324. For example, MSE calculation circuitry 340 may calculate a mean-squared error measurement MSE according to an equation:

$$MSE = \Sigma err^2 = \Sigma[x(n) - \hat{x}(n)]^2 \qquad (3)$$

where the summation of equation (3) corresponds to a weighted sum of the squared differences, obtained over a preselected number of samples, for example over a sliding window of samples in the symbol stream.

As shown in FIG. 3A, timing error detection (TED) circuitry 350 is also included in symbol timing recovery and equalization circuitry 300 in this example. TED circuitry 300 has inputs receiving residue samples x(n) and symbol stream x̂(n) from the input and output, respectively, of slicer 324, and includes logic and memory circuitry configured to generate a timing error signal ted indicating an estimated error of the phase of sampling clock SCLK applied to ADC 308 relative to an optimum point in the symbol period. TED circuitry 350 may, for example, generate timing error signal ted according to the approach described in the above-incorporated Mueller et al. article. According to that approach, timing error signal ted is calculated by TED circuitry 350 according to:

$$ted = x(n) \cdot \hat{x}(n-1) - x(n-1) \cdot \hat{x}(n) \qquad (4)$$

The first term on the right-hand side of this equation (4) corresponds to the first ISI post-cursor $P_1$, while the second term corresponds to the first ISI pre-cursor $P_{-1}$.

Symbol timing recovery and equalization circuitry 300 according to this example, together with clock generator circuitry 220, implements a timing loop configured to adjust the phase of sampling clock SCLK in response to the timing error detected by TED circuitry 350. In this example, this timing loop operates to adjust the sampling phase in order to minimize timing error signal ted generated by TED circuitry 350. As shown in FIG. 3A, timing error signal ted is applied to loop filter 352, which is a digital filter applying a transfer function with the appropriate response and stability for the adjustment of the sampling phase, with the filtered error signal applied to one input of adder 354. The output of adder 354, reflecting the sum of the filtered timing error signal ted with an initialization frequency $f_{init}$ is applied to numerically controlled oscillator (NCO) 356, which generates control signal UP/DN in response to the output of adder 354, for application to clock generator circuitry 220.

Clock generator circuitry 220 may be constructed in various configurations. For example, as shown in FIG. 3A, clock generator circuitry 220 includes phase-locked loop (PLL) 360. PLL 360 generates a clock signal based on a reference clock REFCLK, which may be a reference clock signal generated externally from clock generator circuitry 220; alternatively, clock generator circuitry 220 may include an oscillator generating reference clock REFCLK based on an external clock reference such as a crystal resonator. PLL 360 applies its output clock to phase interpolator (PI) 362, which receives control signal UP/DN from NC 356 in symbol timing recovery and equalization circuitry 300 and generates sampling clock SCLK in response.

In this example, PI 362 is configured to advance the phase of sampling clock SCLK in response to an "up" pulse of control signal UP/DN, and to retard the phase of sampling clock SCLK in response to a "down" pulse of control signal UP/DN. In turn, TED circuitry 350, along with loop filter 352, adder 354 and NCO 356, are configured so that NCO 356 issues an "up" pulse of control signal UP/DN in response to timing error signal ted indicating that the current sampling phase lags the optimum point (e.g., ted is positive due to post-cursor $P_1$ being larger than pre-cursor $P_{-1}$). Conversely, NCO issues a "down" pulse of control signal UP/DN in response to timing error signal ted indicating that the current sampling phase leads the optimum point (e.g., ted is negative due to post-cursor $P_1$ being less than pre-cursor $P_{-1}$). Accordingly, the timing loop of symbol timing recovery and equalization circuitry 300 operates to minimize the amplitude of timing error signal ted.

Continued adjustment of the phase of sampling clock SCLK in the same direction (advancing or retarding) over a number of sampling periods can have the effect of adjusting the frequency of sampling clock SCLK. As such, the phase adjustment or tuning described in this specification can also be considered as frequency adjustment or tuning of sampling clock SCLK.

The operation of symbol timing recovery and equalization circuitry 300 in this example of FIG. 3A is controlled by sequencer logic 330. Sequencer logic 330 may be constructed as programmable or hard-wired sequential logic, configured to enable the functions of symbol timing recovery and equalization circuitry 300 to carry out the desired operations of the various functions, including DFE 320, MSE calculation circuitry 330, and TED circuitry 340. In particular, according to this example embodiment, mean-square error signal MSE from MSE calculation circuitry 340 is applied to sequencer logic 330, in response to which sequencer logic 330 issues a control signal TLOOP_STRT to TED circuitry 350 to initiate the operation of the timing loop of symbol timing recovery and equalization circuitry 300.

Figure 3C:
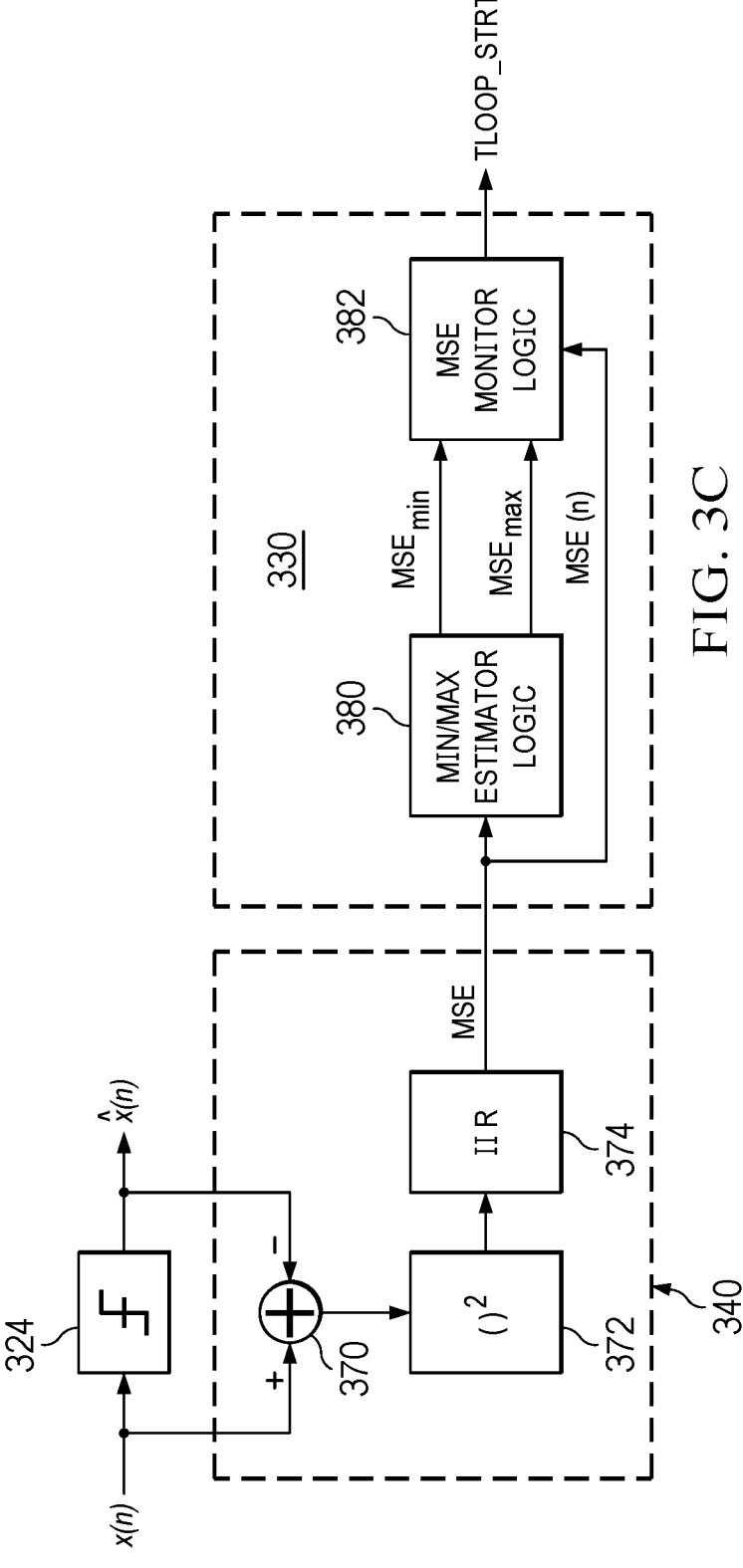
FIG. 3C is an electrical diagram, in block form, of error calculation circuitry according to the example embodiment of FIG. 3A.

FIG. 3C illustrates the construction of MSE calculation circuitry 340 and associated functions, for example as may be included in sequencer logic 330, according to an example embodiment. MSE calculation circuitry 340 includes adder 370 with one input receiving residue samples x(n) at the input of slicer 324 and another input receiving symbol stream x̂(n) from the output of slicer 324. Adder 370 is configured to subtract the slicer output symbol x̂(n) from the residue x(n) for each sample, and provide the resulting difference to squaring function 372, which produces the squared error $[x(n) - \hat{x}(n)]^2$ for each sample. The squared error from function 372 is forwarded to an input of infinite impulse response (IIR) filter 374, which produces error measurement MSE from a weighted sum of the squared error calculations over a sliding window of one or more samples.

Error measurement MSE as output by MSE calculation circuitry 340 is forwarded to min/max estimator logic 380, constructed as logic circuitry or functionality configured to identify a minimum value $MSE_{min}$ and a maximum value $MSE_{max}$ of the error measurement MSE produced by MSE calculation circuitry 340. Minimum error value $MSE_{min}$ and maximum error value $MSE_{max}$ are forwarded to MSE monitor logic 382 in the arrangement of FIG. 3C. MSE monitor logic 382 also receives error measurement MSE from MSE calculation circuitry 340. MSE monitor logic 382 is configured to monitor error measurement MSE over the sample stream relative to a threshold value determined by MSE monitor logic 382 based on minimum error value $MSE_{min}$, or in some implementations, based on minimum error value $MSE_{min}$ together with maximum error value $MSE_{max}$. Based on its monitoring of error measurement MSE, MSE monitor logic 382 is further configured to initiate the operation of the timing loop by generating start signal TLOOP_STRT to TED circuitry 350.

In the example architecture of FIG. 3A, min/max estimator logic 380 and MSE monitor logic 382 are shown as included within sequencer logic 330. Alternatively, these logic functions and circuitry may be incorporated within MSE calculation circuitry 340 itself, or elsewhere within symbol timing recovery and equalization circuitry 300, as appropriate for the particular implementation.

Figure 4:
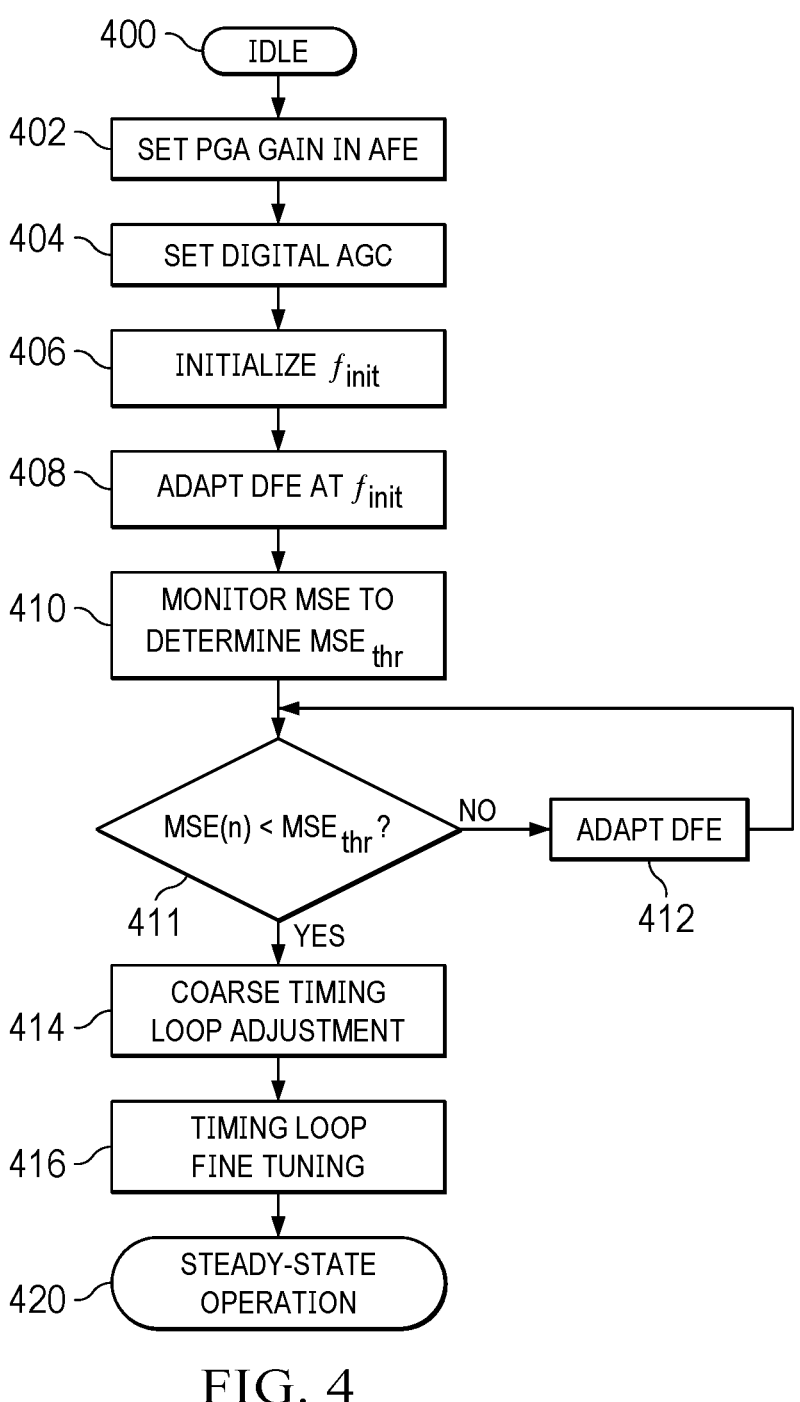
FIG. 4 is a flow diagram illustrating the operation of receive path circuitry according to the example embodiment of FIG. 3A.

Referring now to FIG. 4, the operation of the receive path of PHY 106, including AFE 216, clock generator circuitry 220 and symbol timing recovery and equalization circuitry 300 according to the architecture of FIG. 3A, will now be described in connection with one example embodiment. According to this approach, initiation of the timing loop to adjust the phase of sampling clock SCLK is controlled to occur at a time at which DFE 320 has converged to a low error condition to facilitate the joint convergence of the sampling timing along with equalization of the receive path.

Operation begins with the receive path in an idle state, shown by state 400 of FIG. 4. Upon startup of PHY 106 for the receipt of incoming communications from the network, process 402 is first performed to set the gain of programmable gain amplifier 304 in AFE 216, followed by setting digital AGC 310 based on a measurement of the channel conditions by CAGC 314 in process 404. Tap weights in FFE 312 in symbol timing recovery and equalization circuitry 300 may also be set in process 404, if not previously selected or otherwise established.

In process 406, sequencer logic 330 in symbol timing recovery and equalization circuitry 300 initializes the frequency of sampling clock SCLK to an initialization frequency $f_{init}$. Initialization frequency $f_{init}$ is selected to be a slightly higher frequency than the symbol frequency of the signal received at AFE 216 from the network, for example as set according to a network standard. For the example of "Gigabit Ethernet" over copper wireline, operating according to IEEE standard 802.3ab for the physical layer, the symbol frequency is at a nominal frequency of 125 MHz with a tolerance of ±200 ppm. In that example, initialization frequency $f_{init}$ may be set to a frequency slightly outside and higher than the tolerance band, e.g., at +400 ppm from the nominal frequency of 125 MHz, to ensure that the initialization frequency $f_{init}$ is higher than the symbol frequency of the incoming signals. In the architecture of FIG. 3A, process 406 is carried out by sequencer logic 330 issuing the appropriate initialization frequency signal $f_{init}$ to adder 354. Adder 354 in turn controls NCO 356 to issue the appropriate "up" pulses of control signal UP/DN to phase interpolator 362 in clock generator circuitry 220. At initialization frequency $f_{init}$, phase interpolator 362 advances the phase of sampling clock SCLK in each sample period to result in a sampling frequency that is slightly higher than the symbol frequency of the received signal. The timing loop including TED circuitry 350 is disabled or otherwise not operable at this point, to allow clock generator 220 to advance the phase of sampling clock SCLK in each symbol period according to initialization frequency $f_{init}$. As a result, the sampling point will advance with each symbol period, eventually and periodically wrapping around across the symbol interval.

Figure 5A:
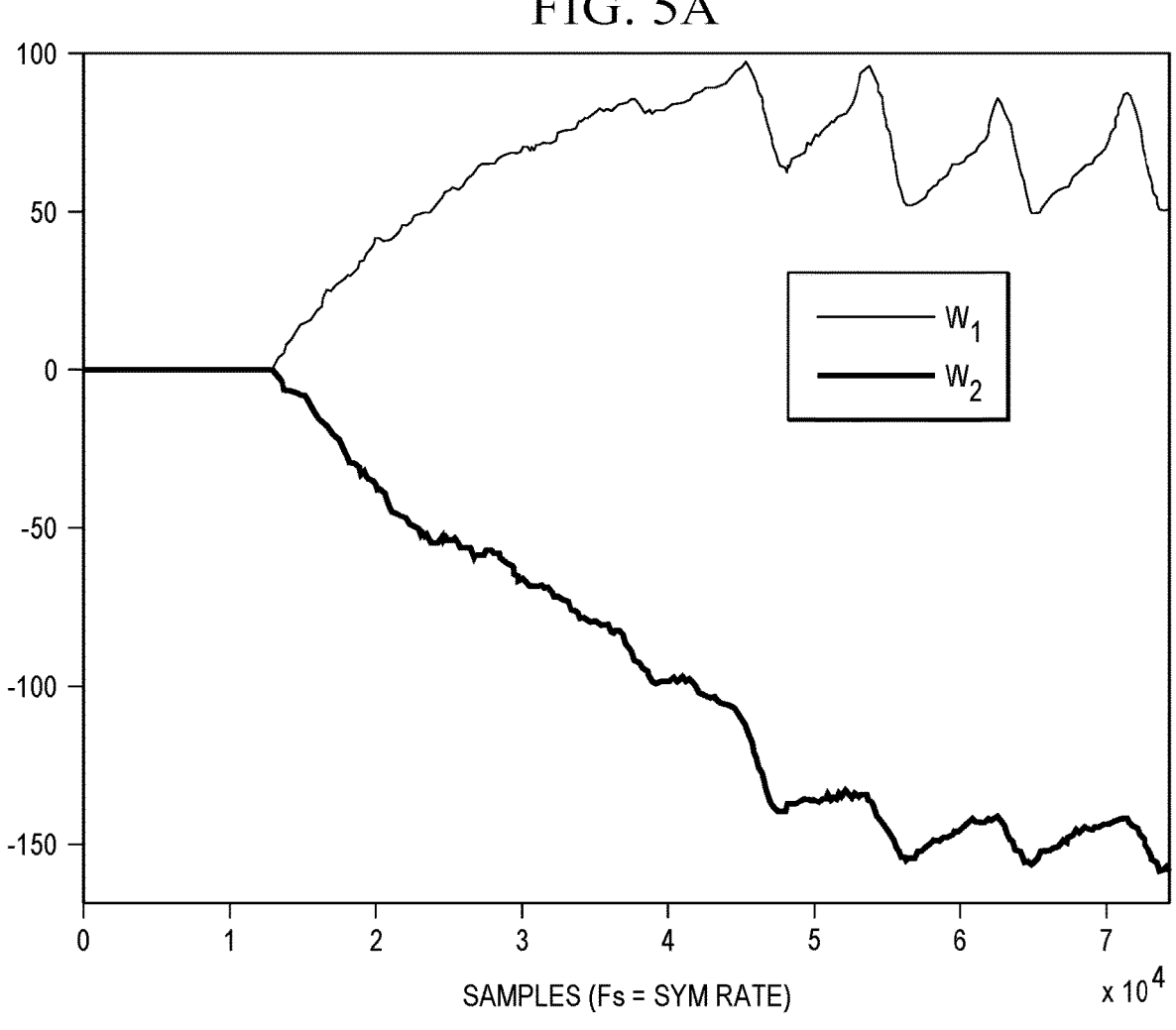
FIG. 5A is a plot of decision feedback equalizer coefficient values during adaptation in an example of operation according to the example embodiment of FIG. 4.

After initialization frequency $f_{init}$ is set in process 406, the coefficients of DFE 320 are adapted in process 408 over a number of samples obtained from the received signals at initialization frequency $f_{init}$. For example, operation and adaptation process 408 continues for a number of sample periods sufficient for the higher initialization frequency $f_{init}$ to have wrapped around the symbol interval at least once, and preferably more than once. FIG. 5A illustrates the behavior of adaptation process 408 for an example implementation in which digital filter 325 is of second order, adapting two tap weights $w_1$ and $w_2$. As shown in FIG. 5A for this example, after performing process 408 for about 4600 samples, the values of tap weights $w_1$ and $w_2$ begin to oscillate as the phase of sampling clock SCLK at initialization frequency $f_{init}$ wraps around the symbol interval, due to initialization frequency $f_{init}$ being at least about 200 ppm higher than the symbol frequency of the received signals.

Figure 5B:
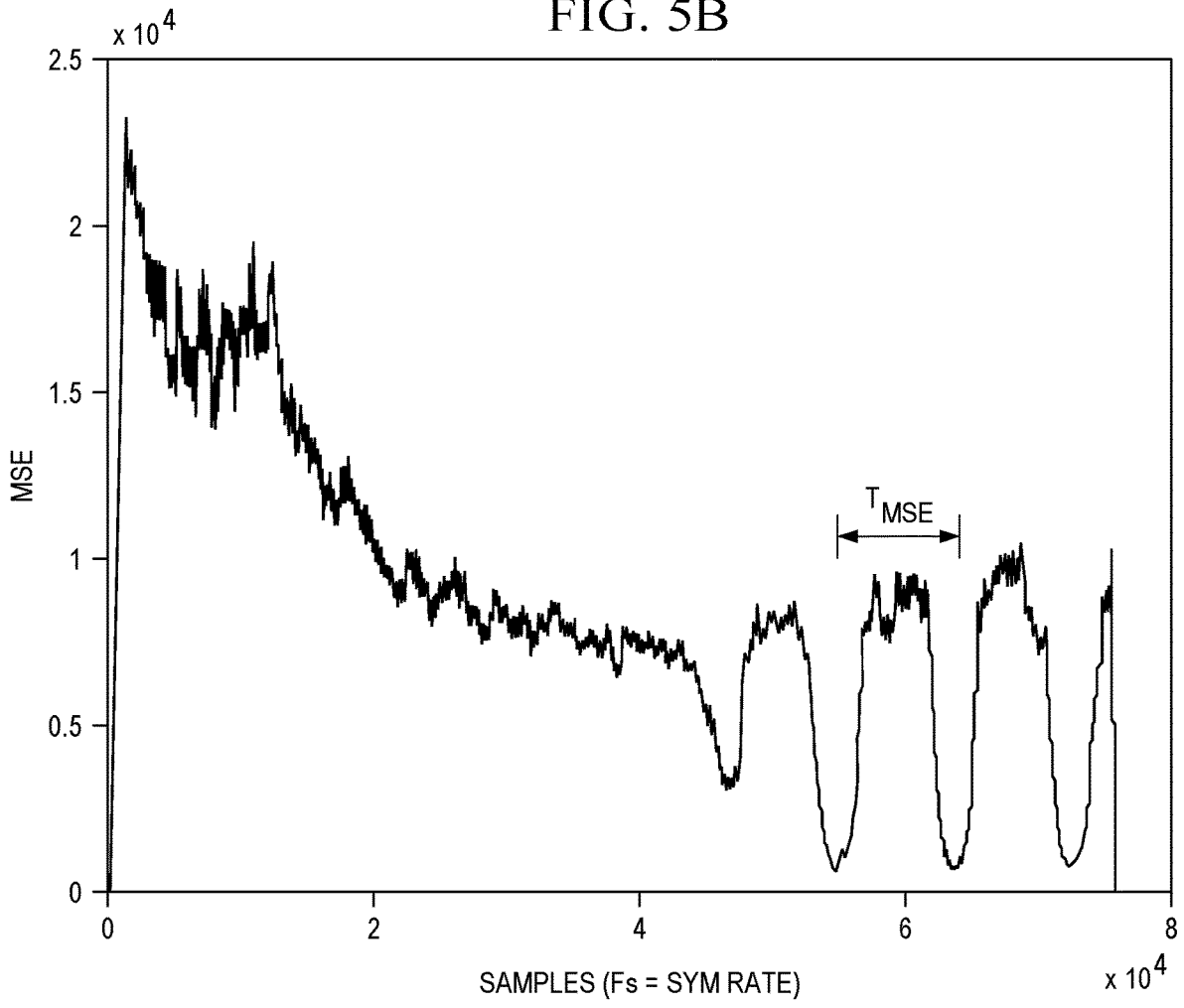
FIG. 5B is a plot of a mean squared error measurement during adaptation in operation according to the example embodiment of FIG. 4.

In process 410, MSE calculation circuitry 340 in symbol timing recovery and equalization circuitry 300 calculates and monitors the error measurement MSE from the output of DFE 320. MSE monitoring process 410 may begin with the first sample obtained in process 408, or may begin later in process 408, considering that DFE 320 will generally not be well-adapted early in process 408. Similarly as the values of tap weights $w_1$ and $w_2$ oscillate as shown in the example of FIG. 5A, error measurement MSE oscillates as the phase of sampling clock SCLK at initialization frequency $f_{init}$ wraps around the symbol interval. FIG. 5B illustrates an example of the calculation of error measurement MSE in process 410, during operation and adaptation process 410. In this example, error measurement MSE has a local minimum at about 4600 samples, with deeper minima occurring at about 5600 samples, 6400 samples, 7200 samples, and so on.

Process 410 in the method of FIG. 4 further includes a determination of a threshold error measurement $MSE_{thr}$. In this example embodiment of FIGS. 3A through 3C, the determination of error measurement threshold $MSE_{thr}$ in process 410 is performed by MSE monitor logic 382 of sequencer logic 330, based upon at least a minimum error measurement $MSE_{min}$ as observed by min/max estimator logic 380 over the samples processed during adaptation of DFE 320 in process 408. For example, error measurement threshold $MSE_{thr}$ may be calculated in process 410 as the minimum error measurement $MSE_{min}$ observed over the samples plus a difference $\Delta$ from that minimum value (e.g., $MSE_{thr}=MSE_{min}+\Delta$). Difference $\Delta$ may be a fixed value, or may be based on the difference between the minimum error measurement $MSE_{min}$ and a maximum error measurement $MSE_{max}$ observed during adaptation of DFE 320 such that, for example:

$$MSE_{thr}=MSE_{min}+[\sigma(MSE_{max}-MSE_{min})] \qquad (5)$$

where $\sigma$ is a selected fraction.

Following the determination of error measurement threshold $MSE_{thr}$ in process 410, MSE monitor logic 382 continues to monitor error measurement MSE as symbol timing recovery and equalization circuitry 300 receives additional incoming symbols. In decision 411 during this monitoring, MSE monitor logic 382 determines whether the most recent error measurement value MSE(n) is below error measurement threshold $MSE_{thr}$ determined in process 410. If not (decision 411 is "no"), DFE 320 is again adapted based on that symbol, and the monitoring continues.

In response to the error measurement value MSE(n) being below error measurement threshold $MSE_{thr}$ (decision 411 is "yes"), sequencer logic 330 initiates operation of the timing loop, for example by MSE monitor logic 382 issuing control signal TLOOP_START to TED circuitry 350 in the example architecture of FIG. 3A. In response to control signal TLOOP_START, TED circuitry 350 operates to generate timing error signal ted. In the example implementation of FIGS. 3A through 3C, timing error signal ted is based on the residue samples x(n) and symbol stream $\hat{x}$(n) from the input and output, respectively, of slicer 324 of DFE 320, for example according to equation (4) discussed above. Operation of the timing loop of TED circuitry 350, loop filter 352, adder 354, NCO 356, and PI 362 may adjust the phase of sampling clock SCLK in response to timing error signal ted first coarsely, and then finely, to more rapidly attain convergence. As shown in FIG. 4, coarse adjustment of the sampling phase is first performed in process 414, followed by fine tuning of the sampling phase in process 416. Continued adaptation of DFE 320 may be performed jointly with adjustment of the timing loop in processes 414, 416 if desired, considering that error measurement MSE is near its minimum at this point in the process.

Following fine tuning of the timing loop in process 416, steady-state operation of the receive path of PHY 106, including AFE 216 and symbol timing recovery and equalization circuitry 300, is carried out in state 420.

According to this example embodiment, joint convergence of equalization and sample timing in a network receiver can be quickly and accurately attained, even in implementations in which the equalization and timing loop are interdependent. This convergence is attained by applying the higher initialization frequency $f_{init}$ during equalizer adaptation to identify equalizer tap weights providing relatively low error, and initiating the timing loop with the equalizer in that low error condition. In other words, sampling phase adjustment begins at a point with the equalizer close to convergence at correct coefficient values, which reduces the time required for convergence of the timing loop as well as the accuracy in that convergence.

According to an alternative example embodiment, the periodicity of the oscillating error measurement as the phase of sampling clock wraps around the symbol intervals of the incoming analog signal is used in providing an initial phase adjustment at the initiation of timing loop adjustment. As shown in FIG. 5B, the oscillating error measurement MSE obtained while ADC 308 samples the received signal at initialization frequency $f_{init}$ exhibits a period $T_{MSE}$. It has been observed, in connection with these example embodiments, that a frequency offset $f_{delta}$ between initialization frequency $f_{init}$ and the symbol frequency of the incoming signals received from the network can be determined from this periodicity at $T_{MSE}$, used to derive an initial phase correction for the sampling clock.

Figure 6A:
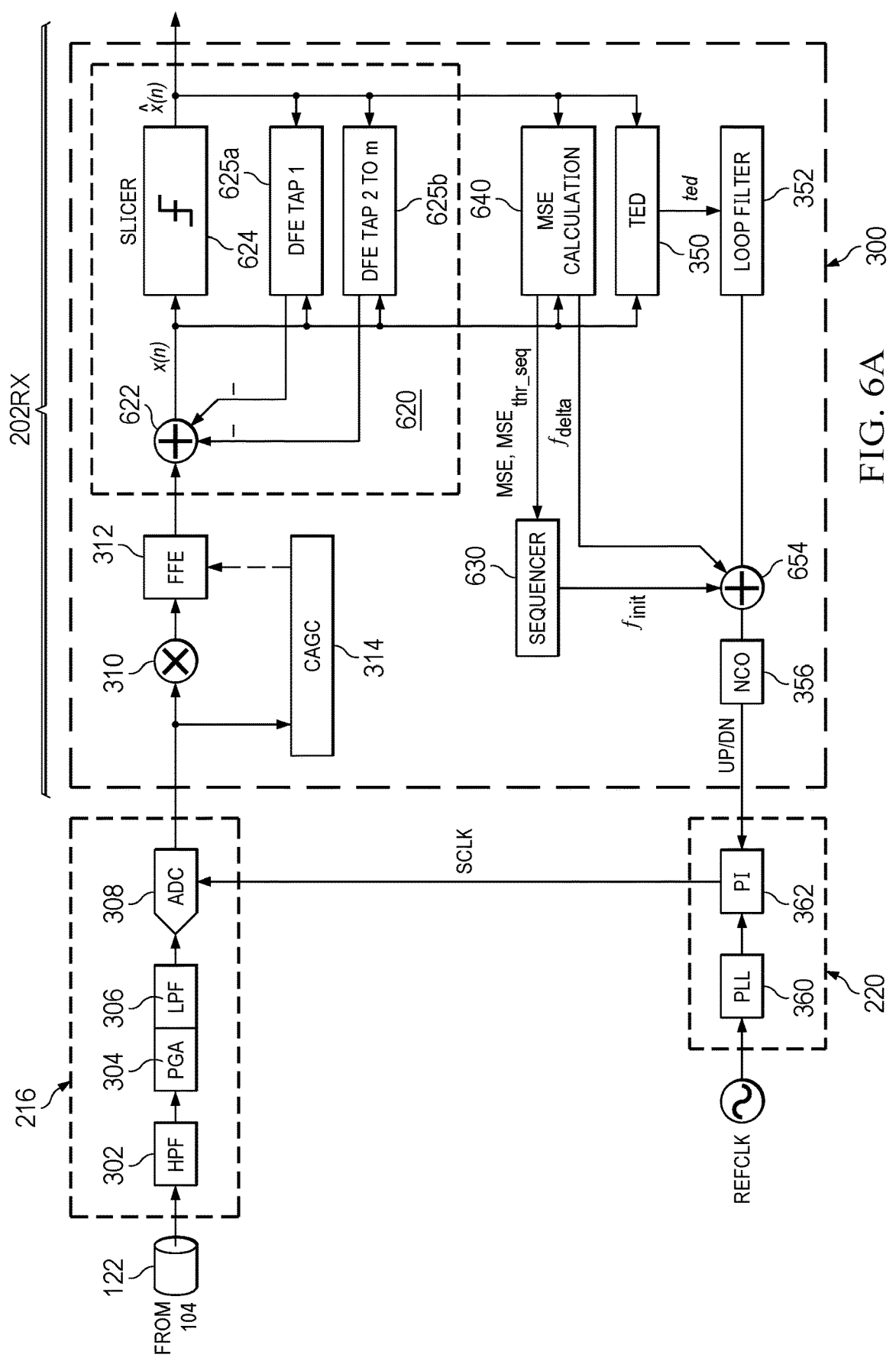
FIG. 6A is an electrical diagram, in block form, of circuitry in the receive path of the PHY of FIG. 2 according to another example embodiment.

FIG. 6A shows the architecture of certain circuitry in the receive path of PHY 106 according to this alternative example embodiment. The same reference numerals are used in FIG. 6A to illustrate the same or similar features or functions shown in the arrangement of FIG. 3A; the preceding description of those same features and functions pertains to the implementation of FIG. 6A. In this alternative implementation, symbol timing recovery and equalization circuitry 600 of FIG. 6A performs the operations of symbol timing recovery from the symbol stream produced by AFE 216 along with adaptation for equalization, as part of clock and data recovery operations performed on the symbol stream from AFE 216. As in the architecture of FIG. 3A, symbol timing recovery and equalization circuitry 600 constitutes a portion of the circuitry of receive processing block 202RX of PHY 106, and may similarly be implemented as an embedded or stand-alone DSP, or as custom, semi-custom, application-specific, or other logic circuitry, programmable or hard-wired, and the like.

The digitized symbol stream produced by AFE 216, and in turn applied to digital AGC function 310 and FFE 312, is in turn applied to DFE 620. DFE 620 in this alternative implementation is arranged similarly as DFE 320 described above, but in this example is arranged to allow selective adaptation of its higher order tap weights $w_2$ to $w_m$ (taps 625b) with respect to its first order tap weight $w_1$ (tap 625a).

Each of TED circuitry 350, loop filter 352, and NCO 356 in the timing loop symbol timing recovery and equalization circuitry 600 according to this alternative implementation is similarly constructed and configured as described above relative to FIG. 3A. Sequencer logic 630 is configured similarly as sequencer logic 330 described above, and as such includes MSE monitor logic for monitoring error measurements MSE as generated by MSE calculation circuitry 640. According to this alternative implementation of FIG. 6A, however, MSE calculation circuitry 640 is configured differently from MSE calculation circuitry 340 described above.

Figure 6B:
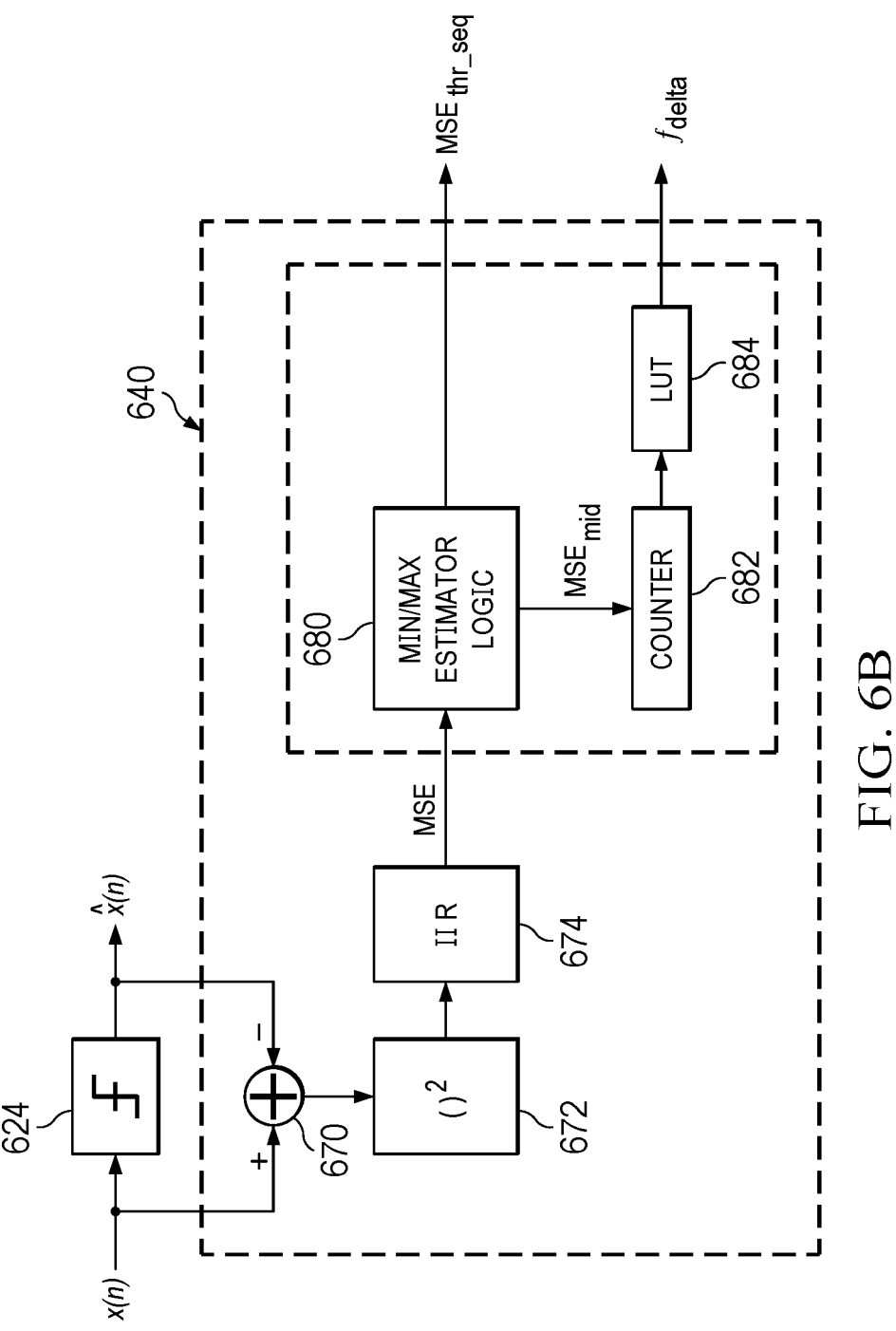
FIG. 6B is an electrical diagram, in block form, of error calculation circuitry in receive path circuitry according to the example embodiment of FIG. 6A

FIG. 6B illustrates the configuration of MSE calculation circuitry 640 in this example implementation of symbol timing recovery and equalization circuitry 600. MSE calculation circuitry 640 includes adder 670 with its inputs coupled to DFE 620 to receive residue samples x(n) and symbol stream $\hat{x}$(n) at the input and output of slicer 624 in DFE 620. Adder 670 is configured to subtract each symbol $\hat{x}$(n) from its corresponding residue x(n) and provide the difference to squaring function 672. Squaring function 672 outputs the square of the difference from adder 670, for application to IIR 674 which produces error measurement MSE as a weighted sum of the squared differences over a sliding window of sample periods. Error measurement MSE for each sample is forwarded to MSE monitor logic in sequencer logic 630, similarly as described above.

In this example as shown in FIG. 6B, MSE calculation circuitry 640 also includes min/max estimator logic 680, counter 682, and look-up table (LUT) 684. Alternatively, some or all of min/max estimator logic 680, counter 682, and LUT 684 may be implemented in sequencer logic 630, or in separate logic or other circuitry included in symbol timing recovery and equalization circuitry 600.

Min/max estimator logic 680 in this example is constructed as logic circuitry or functionality configured to identify certain measures of error from values of error measurement MSE. In this example, min/max estimator logic 680 is configured to compute an error measurement threshold value $MSE_{Thr\_seq}$, based upon which the timing loop is initiated, and to generate an error midpoint value $MSE_{mid}$ corresponding to the arithmetic average of a minimum error measurement $MSE_{min}$ and a maximum error measurement $MSE_{max}$. Error measurement threshold value $MSE_{Thr\_seq}$ is forwarded to sequencer logic 630 in this implementation (FIG. 6A), and error midpoint value $MSE_{mid}$ is forwarded to counter 682 in MSE calculation circuitry 640. Counter 682 also receives error measurement MSE at an input.

Counter 682 in this example is operable to measure a time between crossings of error midpoint value $MSE_{mid}$ by error measurement MSE, for example by counting cycles of a clock signal between midpoint crossings and forwarding that count or time measurement to LUT 684. In this implementation, LUT 684 is a memory resource storing a mapping of count values, which corresponds to the period of the error measurement, to values of a frequency offset $f_{delta}$. This mapping is based on a relationship:

$$\theta = 2\pi(f_{delta} \cdot T_{SYM}) \qquad (6)$$

where $\theta$ is a phase offset within the sample period $T_{SYM}$ resulting from frequency offset $f_{delta}$. Accordingly, correction for the phase offset $\theta$ at frequency offset $f_{delta}$ can place sampling clock SCLK at a correct frequency that matches the symbol period. In this example, the count output by counter 682 is applied as an address to LUT 684, in response to which LUT 684 reads and outputs the mapping stored at that address as frequency offset $f_{delta}$. As shown in FIG. 6A, frequency offset $f_{delta}$ output by LUT 684 is applied to an input of adder 654 along with the output of loop filter 352 and initialization frequency $f_{init}$ from sequencer logic 630.

According to this alternative example embodiment, frequency offset $f_{delta}$ determined by MSE calculation circuitry 640 corresponds to the periodicity of the minima of error measurement MSE as the phase of sampling clock SCLK advances in each symbol period according to initialization frequency $f_{init}$, periodically wrapping around symbol periods. This frequency offset $f_{delta}$ determined by MSE calculation circuitry 640, is used to derive frequency correction for sampling clock SCLK.

Figure 7:
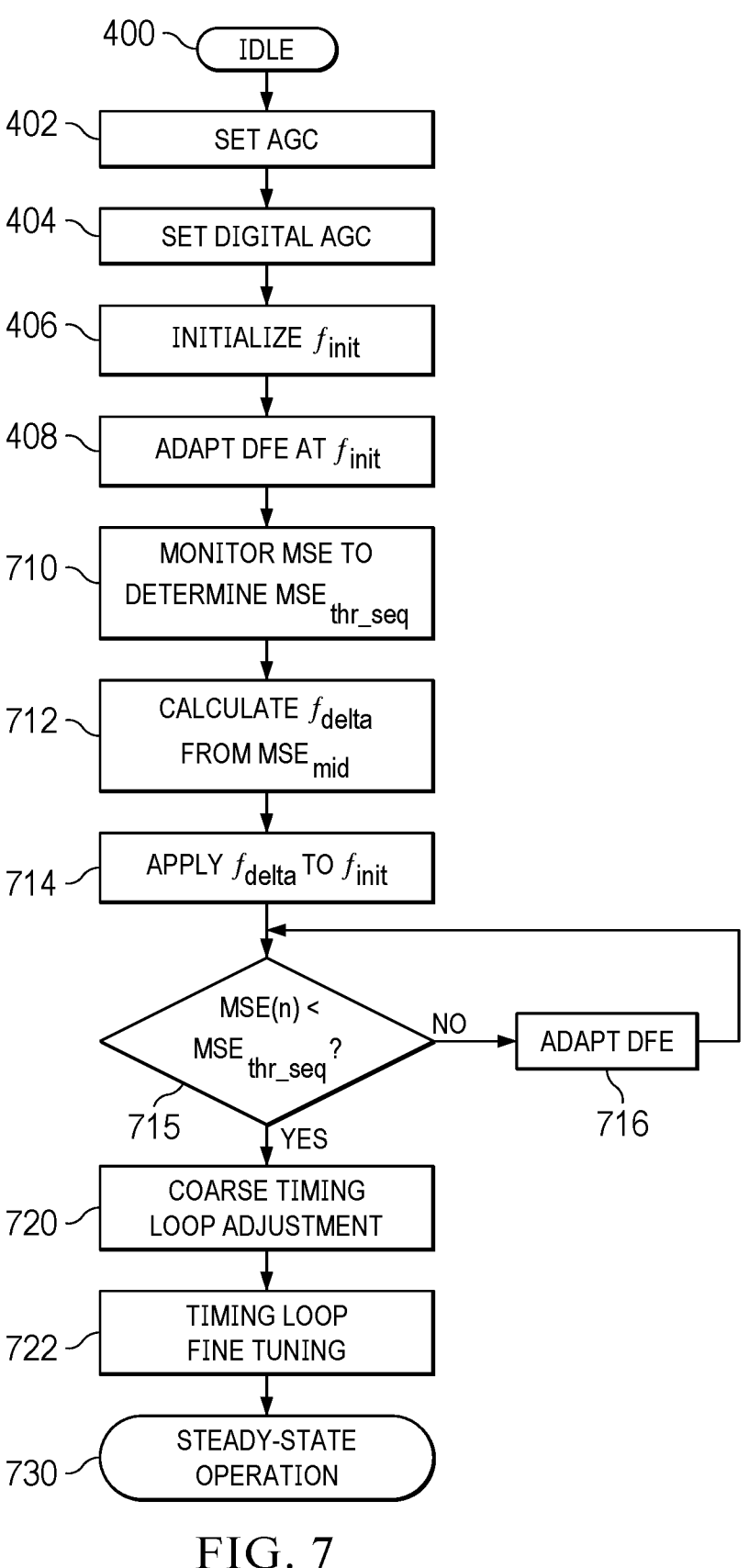
FIG. 7 is a flow diagram illustrating the operation of receive path circuitry according to the example embodiment of FIG. 6A.

FIG. 7 illustrates a method of timing recovery and equalization adaptation based on this observation, according to this alternative example embodiment. In this method, processes 402 through 408 are performed from idle state 400 in the manner described above relative to FIG. 4, including adaptation of DFE 620 during operation of symbol timing recovery and equalization circuitry 600 at initialization frequency $f_{init}$.

According to this example implementation, DFE adaptation process 408 may adapt only the higher order tap weights $w_2$ through $w_m$, and not the first order tap weight $w_1$, if the network channel is short, e.g. 10 meters or shorter. This DFE adaptation for short channels is based on the observation that the ISI post-cursor $P_1$ is generally very small in short channels, and may be negative due to the effects of HPF 302 in AFE 216. It has been observed, in connection with this implementation, that adaptation of first order tap weight $w_1$ during timing loop adjustment may be advantageous in such situations.

In process 710, MSE calculation circuitry 640 generates error measurement MSE for each sample as described above relative to FIG. 4. In this implementation, min/max estimator logic 680 is configured to calculate an error measurement threshold $MSE_{thr\_seq}$ from either or both of an observed minimum value $MSE_{min}$ and maximum value $MSE_{max}$ of the error measurement MSE values produced by MSE calculation circuitry 640. For example, min/max estimator logic 680 may determine error measurement threshold $MSE_{thr\_seq}$ from the minimum error measurement $MSE_{min}$ observed over a number of samples, plus a difference $\Delta$. This difference $\Delta$ may be a fixed value, or may be based on the difference between the minimum error measurement $MSE_{min}$ and a maximum error measurement $MSE_{max}$ observed during adaptation of DFE 620. Once calculated, error measurement threshold $MSE_{thr\_seq}$ is forwarded to sequencer logic 680.

In process 712, MSE calculation circuitry 640 generates frequency offset $f_{delta}$ based on the periodicity of error measurements MSE for samples obtained at initialization frequency $f_{init}$. In this example, this periodicity is measured by counter 682 counting clock cycles between crossings of error midpoint value $MSE_{mid}$ by error measurements MSE, and applying that count to LUT 684 to obtain offset frequency $f_{delta}$.

In process 714, offset frequency $f_{delta}$ determined in process 712 is applied to adder 654, along with initialization frequency $f_{init}$ from sequencer logic 630. The sum output by adder 654 is applied to NCO 356, which applies control signal UP/DN to PI 362 accordingly, adjusting the frequency of sampling clock SCLK to obtain samples of the received signal at ADC 308.

MSE monitor logic in sequencer logic 630 continues monitoring error measurement MSE as symbol timing recovery and equalization circuitry 600 receives additional incoming symbols, comparing new values of error measurement MSE with error measurement threshold $MSE_{thr\_seq}$. In decision 715, sequencer logic 630 determines whether the most recent error measurement value MSE(n) is below error measurement threshold $MSE_{thr\_seq}$ determined in process 710. If not (decision 715 is "no"), DFE 620 is again adapted based on that symbol in process 716, and monitoring continues.

In response to a value of error measurement value MSE being below error measurement threshold $MSE_{thr\_seq}$ (decision 715 is "yes"), sequencer logic 630 initiates operation of the timing loop, for example by issuing control signal TLOOP_START to TED circuitry 350 in the example architecture of FIG. 6A as described above. In response to control signal TLOOP_START, TED circuitry 350 operates to generate timing error signal ted for application to adder 654, via loop filter 352. TED circuitry 350 in this implementation operates similarly as described above relative to FIGS. 3A through 3C, based on differences between the residue samples x(n) and symbol stream $\hat{x}(n)$ at the input and output, respectively, of slicer 624 of DFE 620.

Operation of the timing loop of symbol timing recovery and equalization circuitry 600 may be performed in phases to more rapidly attain convergence, beginning with coarse timing adjustment in process 720. As shown in FIG. 7, fine tuning or adjustment of the sampling phase is then performed in process 722, with such adjustment based on the timing error detected after coarse timing adjustment process 720. If the network channel is a short channel, as may be determined from measurements such as the gain required at PGA 304, the first order tap weight $w_1$ (tap 625a) of DFE 620 may be adapted only during fine tuning process 722, to the extent not previously adapted in process 408 as mentioned above.

In either case, following the fine tuning of the timing loop in process 722, steady-state operation of the receive path of PHY 106, including AFE 216 and symbol timing recovery and equalization circuitry 600, can then be performed in state 730.

According to this alternative example embodiment, joint convergence of equalization and sample timing in a network receive can be quickly and accurately attained, even in implementations in which the equalization and timing loop are interdependent. Convergence is facilitated by the determination of frequency offset $f_{delta}$ from the periodicity of the error measurement MSE over a number of cycles, and incorporating that frequency offset into the phase adjustment of sampling clock SCLK. Upon then initiating the timing loop corrections at a point in which the decision feedback equalizer coefficients have been adapted to values exhibiting relatively low error, and thus close to convergence at correct values, the time required for convergence of the timing loop can be reduced.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device, or other electronics or semiconductor component.

Unless otherwise stated, "about," "approximately," or "substantially" preceding a value means+/−10 percent of the stated value. Modifications are possible in the described examples, and other examples are possible within the scope of the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party. While, in some example embodiments, certain elements are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements are described above as being included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

While one or more embodiments have been described in this specification, it is of course contemplated that modifications of, and alternatives to, these embodiments, such modifications and alternatives capable of obtaining one or more of the technical effects of these embodiments, will be apparent to those of ordinary skill in the art having reference to this specification and its drawings. It is contemplated that such modifications and alternatives are within the scope of the claims presented herein.

What is claimed is:

1. A method comprising:
   sampling an input analog signal having a symbol frequency responsive to a sampling clock;
   converting the sampled input analog signal to a digital sample stream;
   equalizing the digital sample stream with a decision feedback equalizer to produce an output sample stream;
   calculating an error measurement from a plurality of samples of the output sample stream;
   identifying a minimum of the error measurement over the plurality of samples;
   calculating an error threshold value relative to the identified minimum of the error measurement; and
   responsive to the error measurement crossing the error threshold value, adjusting a phase of the sampling clock.

2. The method of claim 1, wherein the step of calculating an error measurement comprises calculating a mean squared error for each of the plurality of samples.

3. The method of claim 2, further comprising adapting at least one tap weight of the decision feedback equalizer, wherein the equalizing step comprises:
   applying a digital filter to samples in the output sample stream, the digital filter including the at least one tap weight, to produce a feedback signal;
   subtracting the feedback signal from samples of the digital sample stream to produce a stream of postcursor filtered samples; and
   slicing the postcursor filtered samples to produce the output digital stream;
   and wherein the step of calculating a mean squared error comprises:
      generating the mean squared error from a difference between the postcursor filtered samples and the output digital stream for each of a plurality of samples.

4. The method of claim 1, wherein the adjusting step comprises:
   adjusting the phase of the sampling clock to minimize a timing error function of the output digital stream.

5. The method of claim 4, wherein the step of calculating an error measurement comprises:

calculating a mean squared error for each of the plurality of samples;

and wherein the adjusting step adjusts a phase of the sampling clock responsive to the error measurement being below the error threshold value.

6. The method of claim 1, wherein the sampling clock is initially at a frequency that is greater than the symbol frequency.

7. The method of claim 6, wherein the sampling clock has a phase that is not dependent on a timing error when it is initially at the frequency greater than the symbol, and wherein responsive to the error measurement crossing the error threshold value, the phase of the sampling clock is adjusted dependent on the timing error.

8. The method of claim 1, further comprising adapting at least one tap weight of the decision feedback equalizer.

9. A method comprising:

sampling an input analog signal having a symbol frequency responsive to a sampling clock;

converting the sampled input analog signal to a digital sample stream;

equalizing the digital sample stream with a decision feedback equalizer to produce an output digital stream;

calculating a mean squared error for each of a plurality of samples of the output sample stream;

observing a periodicity of the mean squared error over the plurality of samples; and responsive to the error measurement crossing an error threshold value:

calculating a frequency offset corresponding to the observed periodicity of minima; and adjusting a phase of the sampling clock according to the frequency offset.

10. The method of claim 9, further comprising:

identifying minima and maxima of the mean squared error;

identifying a threshold value of the mean squared error based on the minima and maxima;

measuring a time interval between crossings of the threshold value by the mean squared error;

mapping the measured time interval to the frequency offset.

11. The method of claim 10, further comprising:

receiving the input analog signal from a communications channel;

after adjusting the phase of the sampling clock according to the adjusted sampling frequency, further adjusting the phase of the sampling clock to minimize a timing error function of the output digital stream at a first adjustment step size; and then further adjusting the phase of the sampling clock to minimize a timing error function of the output digital stream at a second adjustment step size smaller than the first adjustment step size.

12. The method of claim 11, further comprising:

determining whether the communications channel has a length below a length threshold; and responsive to the communications channel having a length below the length threshold:

after adjusting the phase of the sampling clock according to the adjusted sampling frequency, further adjusting the phase of the sampling clock to minimize a timing error function of the output digital stream only at the second adjustment step size.

13. A network communications receiver comprising:

a data converter adapted to receive an analog signal at an input and output a digital sample stream at an output, the analog signal having a symbol frequency, the data converter configured to sample the analog signal responsive to a sampling clock signal and convert the sampled signal to the digital sample stream;

clock generation circuitry configured to generate the sampling clock signal at a phase and frequency responsive to a clock control signal, the clock generation circuitry coupled to the data converter;

digital receiver circuitry having an input coupled to the output of the data converter to receive the digital sample stream, and comprising:

a decision feedback equalizer (DFE) comprising a digital filter with one or more tap weights, and configured to produce an output digital stream from the digital sample stream;

error measurement circuitry coupled to the DFE and configured to:

measure error in samples of the output digital stream;

identify a periodicity of the measured error over a plurality of samples of the output sample stream; and calculate a frequency offset corresponding to the identified periodicity of the measured error:

clock control circuitry coupled to the DFE and configured to generate the clock control signal based on the frequency offset;

sequencer logic coupled to the DFE, the error measurement circuitry, and the clock control circuitry, the sequencer logic configured to control the operation of the decision feedback equalizer, the error measurement circuitry, and the clock control circuitry according to a plurality of operations comprising:

generating a clock control signal responsive to an initialization frequency signal corresponding to a frequency above the symbol frequency of the received analog signal;

adapting at least one of the tap weights of the DFE;

calculating an error measurement from the output sample stream; and responsive to the error measurement crossing an error threshold value, adjusting the clock control signal.

14. The receiver of claim 13, wherein the digital receiver circuitry further comprises:

timing error detection circuitry configured to calculate a timing error signal from the output digital stream;

and wherein the sequencer logic is configured to control the timing error detection circuitry to generate a clock control adjustment to the clock control signal responsive to the error measurement crossing the error threshold value.

15. The receiver of claim 13, wherein the error measurement circuitry is configured to calculate a mean squared error to measure the error in samples of the output sample stream;

wherein identifying the periodicity of the measured error comprises identifying a periodicity of the mean squared error over the plurality of samples of the output sample stream; and wherein calculating the frequency offset comprises calculating the frequency offset corresponding to the identified periodicity of mean squared error.

16. The receiver of claim 15, wherein the error measurement circuitry is configured to:

identify minima and maxima of the mean squared error;

identify a threshold value of the mean squared error based on the minima and maxima;

measure a time interval between crossings of the threshold value by the mean squared error; and map the measured time interval to the frequency offset.

17. The receiver of claim 13, wherein the digital receiver circuitry further comprises:

a feedforward equalizer configured to equalize the digital sample stream prior to the decision feedback equalizer.

18. The receiver of claim 13, wherein the clock generation circuitry comprises:

a phase-locked loop configured to generate a clock signal at a frequency based on a reference clock; and a phase interpolator, having an input receiving the clock control signal, an input receiving the clock signal from the phase-locked loop, and configured to generate the sampling clock signal at a phase responsive to the clock signal and the clock control signal.

19. A network communications receiver comprising:

a data converter adapted to receive an analog signal at an input and output a digital sample stream at an output, the analog signal having a symbol frequency, the data converter configured to sample the analog signal responsive to a sampling clock signal and convert the sampled signal to the digital sample stream;

clock generation circuitry configured to generate the sampling clock signal at a phase and frequency responsive to a clock control signal, the clock generation circuitry coupled to the data converter;

digital receiver circuitry having an input coupled to the output of the data converter to receive the digital sample stream, and comprising:

a decision feedback equalizer (DFE) comprising a digital filter with one or more tap weights, and configured to produce an output digital stream from the digital sample stream;

timing error detection circuitry configured to calculate a timing error signal from the output digital stream;

error measurement circuitry coupled to the DFE and configured to:

calculate a mean squared error in samples of the output sample stream, and identify a minimum of the mean squared error over a plurality of samples of the output sample stream;

clock control circuitry coupled to the DFE and configured to generate the clock control signal;

sequencer logic coupled to the DFE, the error measurement circuitry, and the clock control circuitry, and configured to generate a start signal to the timing error detection circuitry responsive to the error measurement being below an error threshold value determined from the minimum of the mean squared error.

20. The receiver of claim 19, wherein the sequencer logic is configured to control the operation of the decision feedback equalizer, the error measurement circuitry, and the clock control circuitry according to a plurality of operations comprising:

generating a clock control signal responsive to an initialization frequency signal corresponding to a frequency above the symbol frequency of the received analog signal;

adapting at least one of the tap weights of the DFE;

calculating an error measurement from the output sample stream; and responsive to the error measurement crossing an error threshold value, adjusting the clock control signal.

21. A physical layer transceiver comprising:

a media independent interface;

a media dependent interface;

a transmit processing block coupled to the media independent interface;

a transmitter subsystem, coupled between the transmit processing block and the media dependent interface, the transmitter subsystem configured to communicate analog signals corresponding to data from the transmit processing block over the media dependent interface;

a data converter coupled to the media dependent interface and adapted to receive an analog signal from the media dependent interface, the analog signal having a symbol frequency, the data converter configured to sample the analog signal responsive to a sampling clock signal and convert the sampled signal to a digital sample stream;

clock generation circuitry coupled to the data converter and configured to generate the sampling clock signal at a phase and frequency responsive to a clock control signal; and a receive processing block coupled to the media independent interface, and comprising:

symbol timing recovery and equalization circuitry, comprising:

a decision feedback equalizer comprising a digital filter with one or more tap weights, and configured to produce an output digital stream from the digital sample stream;

error measurement circuitry coupled to the decision feedback equalizer and configured to measure error in samples of the output digital stream;

clock control circuitry coupled to the error measurement circuitry and configured to generate the clock control signal; and sequencer logic coupled to the decision feedback equalizer, the error measurement circuitry, and clock control circuitry, the sequencer logic configured to control the operation of the decision feedback equalizer, the error measurement circuitry, and the clock control circuitry according to a plurality of operations comprising:

generating a clock control signal responsive to an initialization frequency signal corresponding to a frequency above the symbol frequency of the received analog signal;

adapting at least one of the tap weights of the DFE;

calculating an error measurement from the output sample stream; and responsive to the error measurement crossing an error threshold value, adjusting the clock control signal, wherein the error measurement circuitry is configured to:

calculate a mean squared error in samples of the output sample stream, and identify a minimum of the mean squared error over a plurality of samples of the output sample stream;

and wherein the sequencer logic is further configured to generate a start signal to a timing error detection circuitry responsive to the error measurement being below an error threshold value determined from the minimum of the mean squared error.

22. A physical layer transceiver comprising:

a media independent interface;

a media dependent interface;

a transmit processing block coupled to the media independent interface;

a transmitter subsystem, coupled between the transmit processing block and the media dependent interface, the transmitter subsystem configured to communicate analog signals corresponding to data from the transmit processing block over the media dependent interface;

a data converter coupled to the media dependent interface and adapted to receive an analog signal from the media dependent interface, the analog signal having a symbol frequency, the data converter configured to sample the analog signal responsive to a sampling clock signal and convert the sampled signal to a digital sample stream;

clock generation circuitry coupled to the data converter and configured to generate the sampling clock signal at a phase and frequency responsive to a clock control signal; and a receive processing block coupled to the media independent interface, and comprising:

symbol timing recovery and equalization circuitry, comprising:

a decision feedback equalizer comprising a digital filter with one or more tap weights, and configured to produce an output digital stream from the digital sample stream;

error measurement circuitry coupled to the decision feedback equalizer and configured to measure error in samples of the output digital stream;

clock control circuitry coupled to the error measurement circuitry and configured to generate the clock control signal; and sequencer logic coupled to the decision feedback equalizer, the error measurement circuitry, and clock control circuitry, the sequencer logic configured to control the operation of the decision feedback equalizer, the error measurement circuitry, and the clock control circuitry according to a plurality of operations comprising:

generating a clock control signal responsive to an initialization frequency signal corresponding to a frequency above the symbol frequency of the received analog signal;

adapting at least one of the tap weights of the DFE;

calculating an error measurement from the output sample stream; and responsive to the error measurement crossing an error threshold value, adjusting the clock control signal, wherein the error measurement circuitry is configured to:

calculate a mean squared error in samples of the output sample stream;

identify a periodicity of the mean squared error over a plurality of samples of the output sample stream; and calculate a frequency offset corresponding to the identified periodicity of mean squared error;

wherein the clock control circuitry is configured to adjust the clock control signal responsive to the frequency offset.

23. The transceiver of claim 22, wherein the error measurement circuitry is configured to calculate the adjusted sampling frequency by:

identifying minima and maxima of the mean squared error;

identifying a threshold value of the mean squared error based on the minima and maxima;

measuring a time interval between crossings of the threshold value by the mean squared error; and mapping the measured time interval to the frequency offset.

* * * * *